United States Patent [19]
Richardson et al.

[11] Patent Number: 5,568,527
[45] Date of Patent: Oct. 22, 1996

[54] METHOD AND APPARATUS FOR REMOTE ULTRASONIC INSPECTION OF CORE SPRAY T-BOX WELDS

[75] Inventors: David L. Richardson, Los Gatos; James C. S. Tung, Santa Clara; David C. Berg, San Jose, all of Calif.

[73] Assignee: General Electric Company, San Jose, Calif.

[21] Appl. No.: 388,339

[22] Filed: Feb. 14, 1995

[51] Int. Cl.⁶ .................................................. G21C 17/00
[52] U.S. Cl. ........................ 376/245; 376/249; 376/282; 376/252; 376/210
[58] Field of Search .................................. 376/245, 249, 376/282, 252, 451, 292, 210, 213; 156/626.1; 976/DIG. 214; 73/850, 853, 851, 852

[56] References Cited

U.S. PATENT DOCUMENTS

| | | | |
|---|---|---|---|
| 3,602,036 | 8/1971 | Peterson | 73/67.8 |
| 4,302,656 | 11/1979 | Poth et al. | 219/137 PS |
| 4,336,104 | 6/1982 | Figlhuber et al. | 376/249 |
| 4,404,853 | 9/1983 | Livingston | 73/622 |
| 4,416,846 | 11/1983 | Kastl et al. | 376/249 |
| 4,523,287 | 6/1985 | Kogawa | 364/513 |
| 4,548,785 | 10/1985 | Richardson et al. | 376/249 |
| 4,680,967 | 7/1987 | Rost | 73/628 |
| 5,451,284 | 9/1995 | Ikeda et al. | 156/247 |

*Primary Examiner*—Charles T. Jordan
*Assistant Examiner*—Meena Chelliah
*Attorney, Agent, or Firm*—James E. McGinness

[57] ABSTRACT

A method and an apparatus for in situ ultrasonic inspection of the core spray T-box to thermal sleeve attachment weld and the core spray T-box to cover plate attachment weld in BWRs. The apparatus incorporates a stationary clamping mechanism and sliding and rotational mechanisms which are operated remotely to scan the transducer over the T-box welds and heat-affected zones thereof. The T-box weld inspection tool comprises the following assemblies: clamping jaws for clamping the tool onto the T-box arms in response to activation of a pair of pneumatic cylinders; a side slide stage having a transducer carriage which is slidable in parallel with the centerline axis of the thermal sleeve in response to activation of a first drive motor; a radial face stage having a transducer carriage which is slidable in a direction perpendicular to the centerline axis of the thermal sleeve in response to activation of a second drive motor; and a rotation stage which rotatably supports both the side slide stage and the radial face stage for rotation about the centerline axis of the thermal sleeve in response to activation of third and fourth drive motors, respectively. The transducers carried on the radial face stage are used to interrogate the T-box to cover plate attachment weld; the transducers carried on the side slide stage are used to interrogate both the T-box to cover plate and the T-box to thermal sleeve attachment welds.

16 Claims, 8 Drawing Sheets

METHOD AND APPARATUS FOR REMOTE ULTRASONIC INSPECTION OF CORE SPRAY T-BOX WELDS

FIELD OF THE INVENTION

This invention relates generally to nondestructive examination of material, such as metal, for voids, flaws, cracks and other defects that can be detrimental to the integrity of the material. Specifically, the invention relates to the ultrasonic inspection of core spray T-box welds inside the reactor pressure vessel of a boiling water reactor.

BACKGROUND OF THE INVENTION

Figure 1:
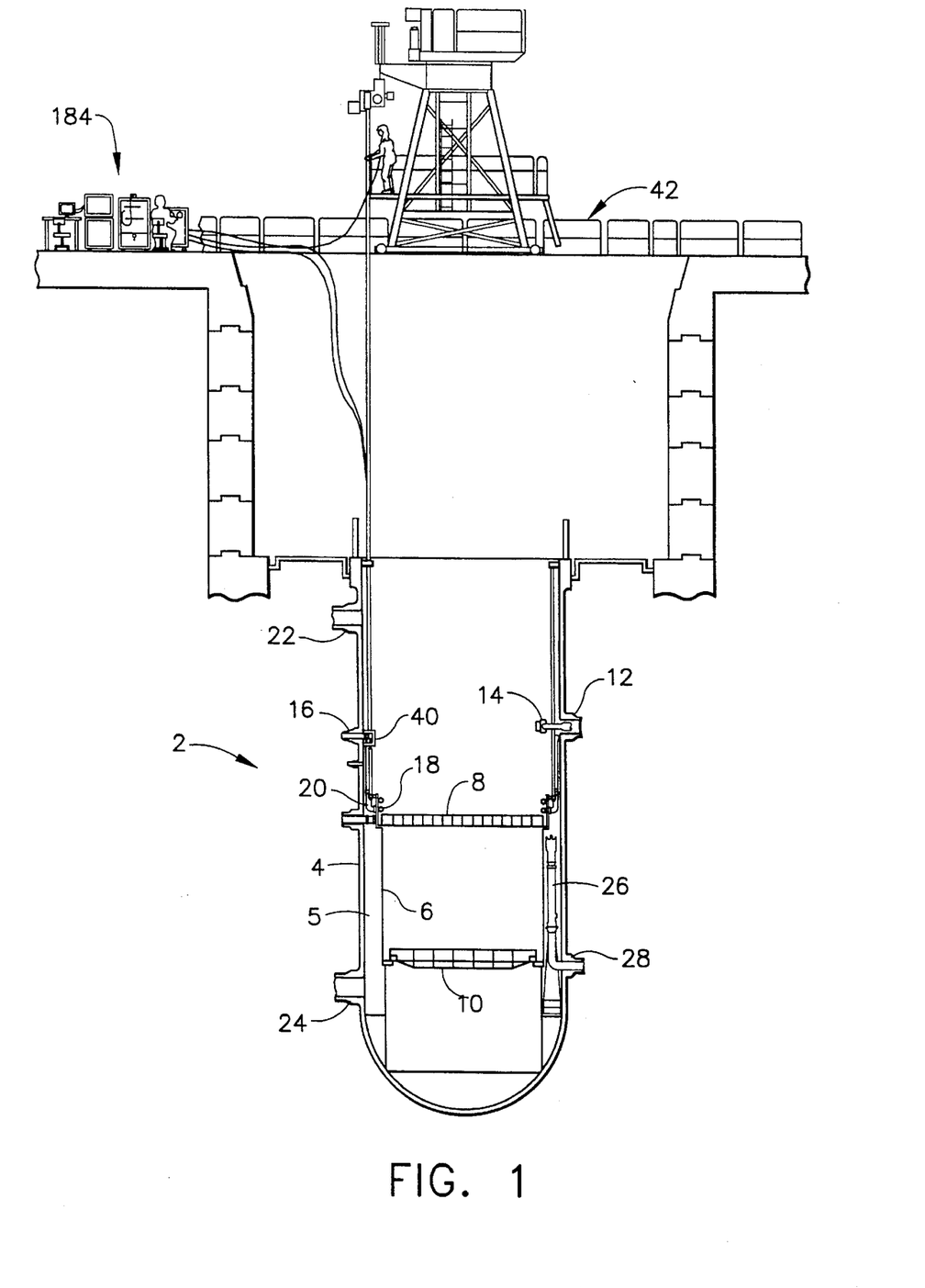
FIG. 1 is a schematic representation of a conventional boiling water reactor having the T-box weld inspection system of the present invention installed therein.

The structure of a water-cooled and water-moderated nuclear reactor of the boiling water type is well known. (See, e.g., U.S. Pat. Nos. 4,548,785 and 5,118,464 to Richardson et al.) As depicted in FIG. 1, a boiling water reactor 2 (BWR) includes a reactor pressure vessel 4 (RPV) containing a nuclear reactor core (not shown) submerged in a coolant-moderator such as light water. The core, which is surrounded by a circular cylindrical shroud 6, includes a plurality of replaceable fuel assemblies (not shown) arranged in spaced relation between a top guide 8 and a core plate 10. The fuel bundle assemblies are supported at the top by the top guide 8 and at the bottom by the core plate 10. The core top guide provides lateral support for the top of the fuel assemblies and maintains the correct fuel channel spacing to permit control rod insertion.

The annular space between the RPV 4 and the shroud 6 forms the downcomer annulus 5. Water recirculates inside the RPV, flowing vertically downward through the downcomer annulus 5, around the bottom edge of core shroud 6 and then vertically upward through the fuel core inside the shroud. After passing through the water-steam separators (not shown), the separated liquid water then mixes with feedwater in the mixing plenum. In the conventional BWR, feedwater is admitted into the RPV 10 via a feedwater nozzle 12 and a feedwater sparger 14, which is a ring-shaped pipe having suitable apertures for circumferentially distributing the feedwater inside the RPV. The separated water/feedwater mixture then returns to the core via the downcomer annulus. The steam is withdrawn from the RPV via steam outlet 22.

The BWR also includes a coolant recirculation system which provides the forced convection flow through the core necessary to attain the required power density. A portion of the water is sucked from the lower end of the downcomer annulus 16 via recirculation water outlet 24 and forced by a centrifugal recirculation pump (not shown) into jet pump assemblies 26 (only one of which is shown) via recirculation water inlets 28. The BWR has two recirculation pumps, each of which provides the driving flow for a plurality of jet pump assemblies circumferentially distributed around the shroud 6.

Figure 2:
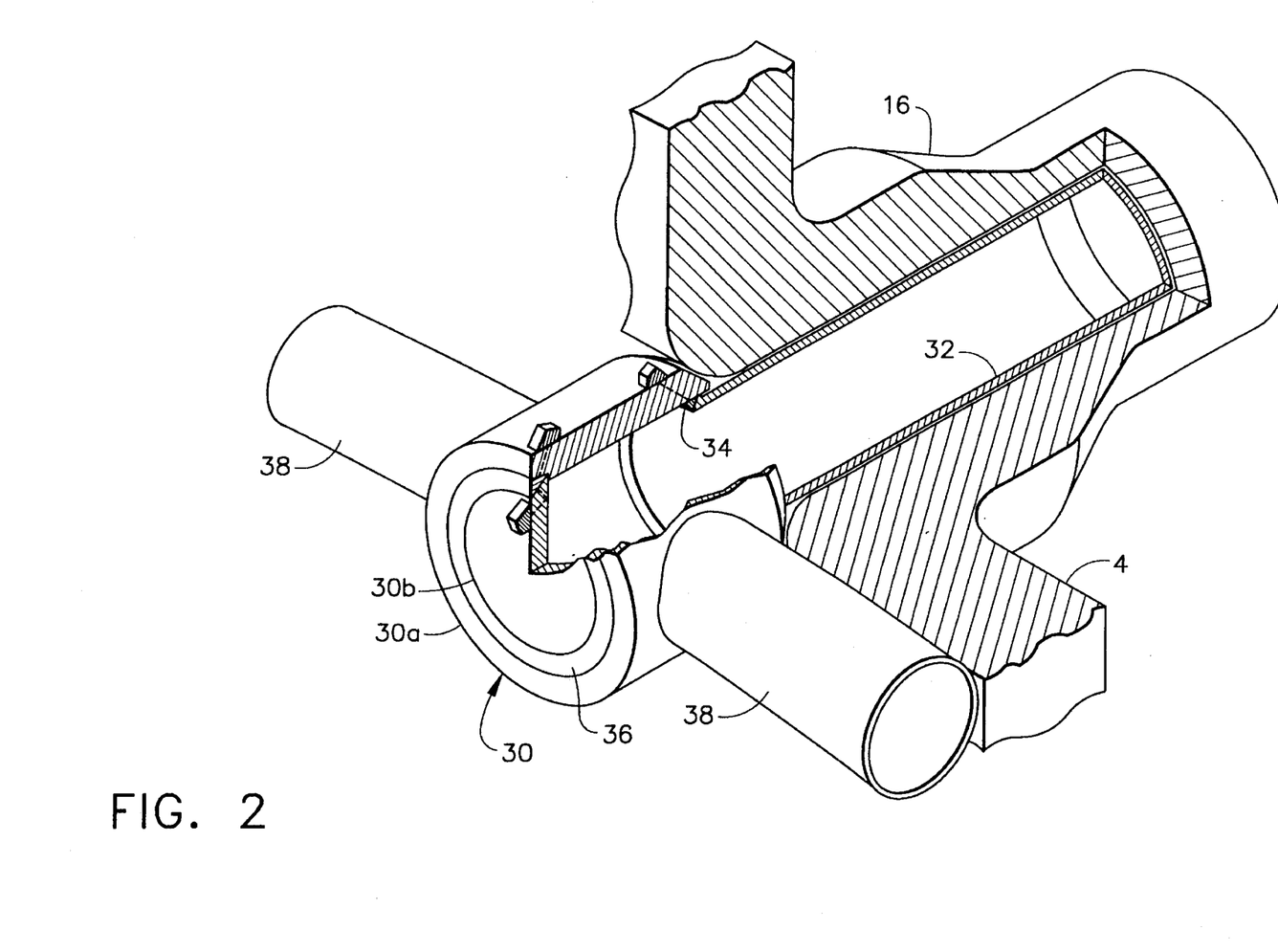
FIG. 2 is a partially sectioned isometric view of a conventional core spray T-box assembly coupled to a core spray nozzle formed on a reactor pressure vessel.
Figure 3:
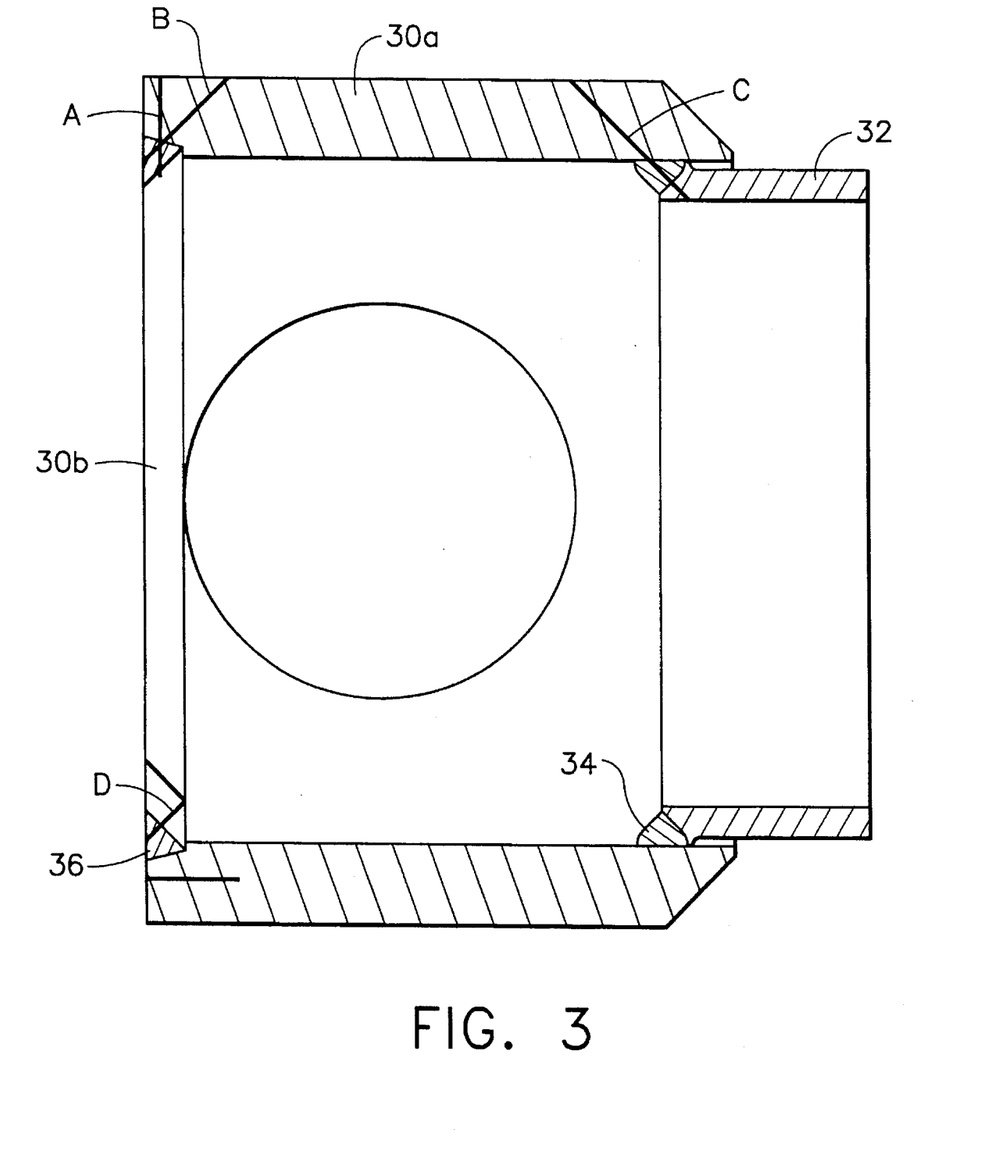
FIG. 3 is a schematic representation of a core spray T-box assembly being interrogated by ultrasonic transducers in accordance with the crack detection technique of the present invention.

A core spray nozzle 16 supplies water to a core spray sparger 18 via core spray line 20 (see FIG. 1) in the event the emergency core cooling is required, e.g., in response to a loss-of-coolant accident. Installation of BWR 3/4/5 core spray lines inside the RPV requires initially that the core spray line 20 and T-box assembly 30 (see FIG. 2) be fitted to the thermal sleeve 32 in the core spray nozzle 16. The T-box 30a is then welded to the thermal sleeve 32 from the inside through access provided by the T-box front cover 30b. The resulting T-box to thermal sleeve weld 34 is creviced, as seen in FIG. 3. Finally, the front cover 30b is welded to the T-box 30a. The resulting front cover weld 36 is also creviced. The material of the T-box, front cover, thermal sleeve and associated welds is austenitic stainless steel having normal carbon content. Thus, some residual weld stresses can be expected. Therefore, the mechanisms are present for circumferential welds 34 and 36 to be susceptible to intergranular stress corrosion cracking (IGSCC).

As is evident from the foregoing, T-box assembly 30 is part of the emergency core cooling system and any defect (e.g., cracks) therein can jeopardize the proper operation of that system. Under certain conditions, the T-box assembly could undergo stress corrosion cracking in the heat-affected zones adjacent to the crevice welds 34 and 36. During core spray operation, complete failure of the thermal sleeve attachment weld 34 could lead to the opening-up of a gap between the T-box 30a and the thermal sleeve 32, thereby spilling some of the core spray flow out the gap. Since the gap is outside of the core shroud 6, the spilling water would be lost from both spray and reflood injection in the postulated case of a recirculation pipe rupture below the core elevation. In the case of the T-box front cover plate 30b exiting its position due to IGSCC, complete failure of that half of the core spray system could be expected.

Thus, the creviced welds 34 and 36 need to be examined periodically to determine their structural integrity and the need for repair. Ultrasonic inspection is a known technique for detecting cracks in nuclear reactor components. However, the core spray T-box welds are inherently difficult to access. Therefore, means for remotely and automatically inspecting the core spray T-box welds are needed.

SUMMARY OF THE INVENTION

The present invention is a method and an apparatus for in situ ultrasonic inspection of the core spray T-box to thermal sleeve attachment weld and the core spray T-box to cover plate attachment weld in BWRs. The testing apparatus is used during an outage wherein the reactor internals (i.e., steam separator and steam dryer) have been removed, which allows access to the inspection area. The testing apparatus is lowered from the refueling bridge into the reactor cavity via poles/hoists and is locked in place on the T-box arms by hydraulic techniques. The apparatus is operated remotely from a central computer control station installed on the refueling floor. By use of air-actuated cylinders and DC motor drive mechanisms, ultrasonic transducers are placed in strategic positions whereat the T-box welds and heat-affected zones thereof can be interrogated with ultrasonic waves. The transducers are acoustically coupled to the inspection area using either contact or water-immersion techniques. The testing technique utilizes longitudinal, refracted longitudinal, or shear sound waves.

The remotely operated scanning apparatus of the present invention allows cracks in the T-box welds and heat-affected zones thereof to be detected despite the radioactive and remote underwater environment in which the core spray T-box resides. The apparatus includes multiple carriages and rotary devices for causing ultrasonic transducers to scan along the contours of the T-box attachment welds. Ultrasonic signals are transmitted through suitable wiring from an external source to the transducer apparatus, which may employ pulse-echo mode of examination to test the specific welds in question. The apparatus includes a signal generator, a receiver, multiple channel multiplexing and visual display. Data is stored digitally on floppy or optical disk and can be presented in real time, graphically.

The apparatus incorporates a stationary clamping mechanism and sliding and rotational mechanisms which are operated remotely to scan the transducer over the T-box welds and heat-affected zones thereof. In accordance with the preferred embodiment of the invention, the T-box weld inspection tool comprises the following assemblies: clamping jaws for clamping the tool onto the T-box arms in response to activation of a pair of pneumatic cylinders; a side slide stage having a transducer carriage which is slidable in parallel with the longitudinal axis of the thermal sleeve in response to activation of a first drive motor; a radial face stage having a transducer carriage which is slidable in a direction perpendicular to the centerline axis of the thermal sleeve in response to activation of a second drive motor; and a rotation stage which rotatably supports both the side slide stage and the radial face stage for rotation about the centerline axis of the thermal sleeve in response to activation of third and fourth drive motors, respectively. The transducers carried on the radial face stage are used to interrogate the T-box to cover plate attachment weld; the transducers carried on the side slide stage are used to interrogate both the T-box to cover plate and the T-box to thermal sleeve attachment welds.

DETAILED DESCRIPTION OF THE PREFERRED EMBODIMENTS

The invention is described herein as applied to the examination of the circumferential weld which attaches a core spray T-box to a thermal sleeve inside the core spray nozzle and the circumferential weld which attaches the cover plate to the T-box. However, an artisan of ordinary skill in the art of nondestructive examination will readily appreciate that the method and apparatus of the invention are generally applicable to the detection of cracks in any piping system having a geometry similar to that of the core spray T-box assembly.

To accommodate inspection of the core spray T-box attachment welds, it is necessary that reactor steam separator and steam dryer be temporarily removed during outages. A T-box attachment weld inspection tool 40 is then lowered through the reactor water from the refueling bridge 42 (see FIG. 1) and clamped on the T-box arms 38 (see FIG. 4).

Figure 4:
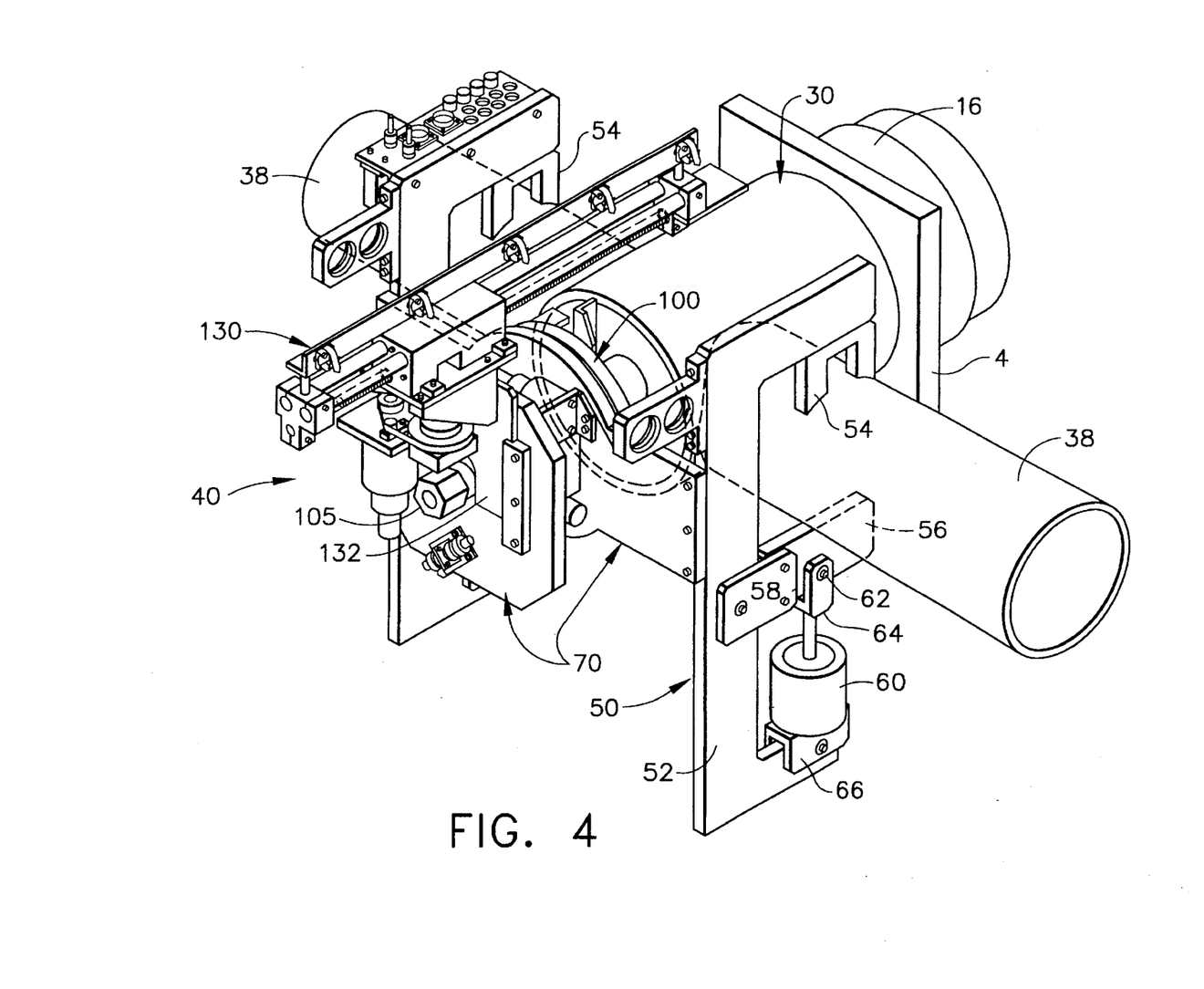
FIG. 4 is an isometric view of the T-box detection tool in accordance with the preferred embodiment of the invention.

Referring to FIG. 4, the T-box weld inspection tool 40 is clamped onto the T-box arms 38 by a pair of clamping mechanism assemblies 50. Each clamping mechanism 50 comprises a strut 52, a clamp insert 54 and a lower jaw 56. The lower jaw 56 is pivotable relative to strut 52 via a jaw pivot plate 58 and is coupled to an air-actuated cylinder 60 via a jaw pin 62 and a jaw clevis 64. The cylinder 60 is mounted to strut 52 via a cylinder clevis 66. In response to activation of each cylinder 60 by a solenoid valve 61 (see FIG. 8), each lower jaw 56 is rotated into abutment with a corresponding T-box arm 38, thereby clamping the tool on the T-box arms.

Each clamping mechanism assembly 50 is connected to and supports a fixed plate 72 of a rotation stage 70. The rotation stage 70 in turn rotatably supports the side slide stage 130 and the radial face stage 100,, as described in detail below. The clamping mechanisms are positioned so that the axis of rotation of the rotation stage is coaxial with the centerline axis of the thermal sleeve.

Figure 5:
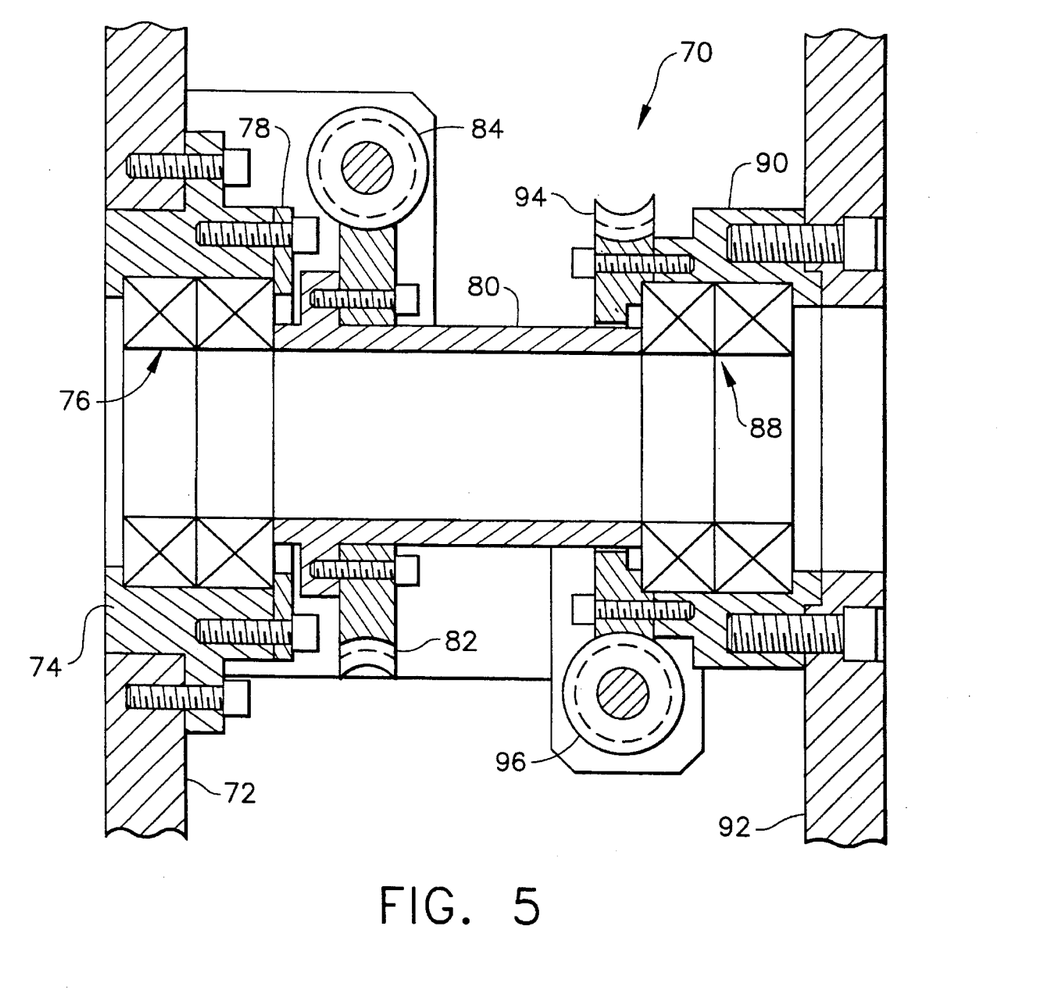
FIG. 5 is an elevation view of the rotation stage incorporated in the inspection tool shown in FIG. 4.

Referring to FIG. 5, the fixed plate 72 has a central opening in which an inner flange 74 is installed. Inner flange 74 has an offset bore for receiving the stationary part of a duplex bearing 76, which is held in place by a bearing retaining plate 78. One end of a center spacer 80 is mounted to the rotatable part of the bearing 76 such that the center spacer is rotatable relative to the fixed plate 72. As described in detail hereinafter with reference to FIG. 6, a rotary shaft connected to the radial face stage is attached by way of a rotation nut 105 (see FIG. 4) to center spacer 80 for rotation therewith. Referring to FIG. 5, a radial face stage gear 82 is mounted on the outer circumference of center spacer 80 and is threadably coupled to a worm gear 84, which is driven to rotate by a drive motor 86 (shown in FIG. 8) mounted on fixed plate 72. In response to rotation of worm gear 84, the gear 82 and radial face stage mounted thereon are rotated about the centerline axis of the thermal sleeve.

The other end of a center spacer 80 is mounted to a first part of a duplex bearing 88. An outer flange 90, mounted to a second part of duplex bearing 88, is installed in a central opening of a side slide mounting plate 92, on which the side slide stage is mounted. The first and second parts of duplex bearing 88 are rotatable relative to each other. Therefore outer flange 90 and the side slide stage coupled thereto are rotatable relative to the center spacer 80. A side slide stage gear 94 is attached to outer flange 90 and is threadably coupled to a worm gear 96, which is driven to rotate by a drive motor 98 (shown in FIG. 8) mounted on fixed plate 72. In response to rotation of worm gear 96, the gear 94 and side slide stage connected thereto are rotated about the centerline axis of the thermal sleeve.

Figure 6:
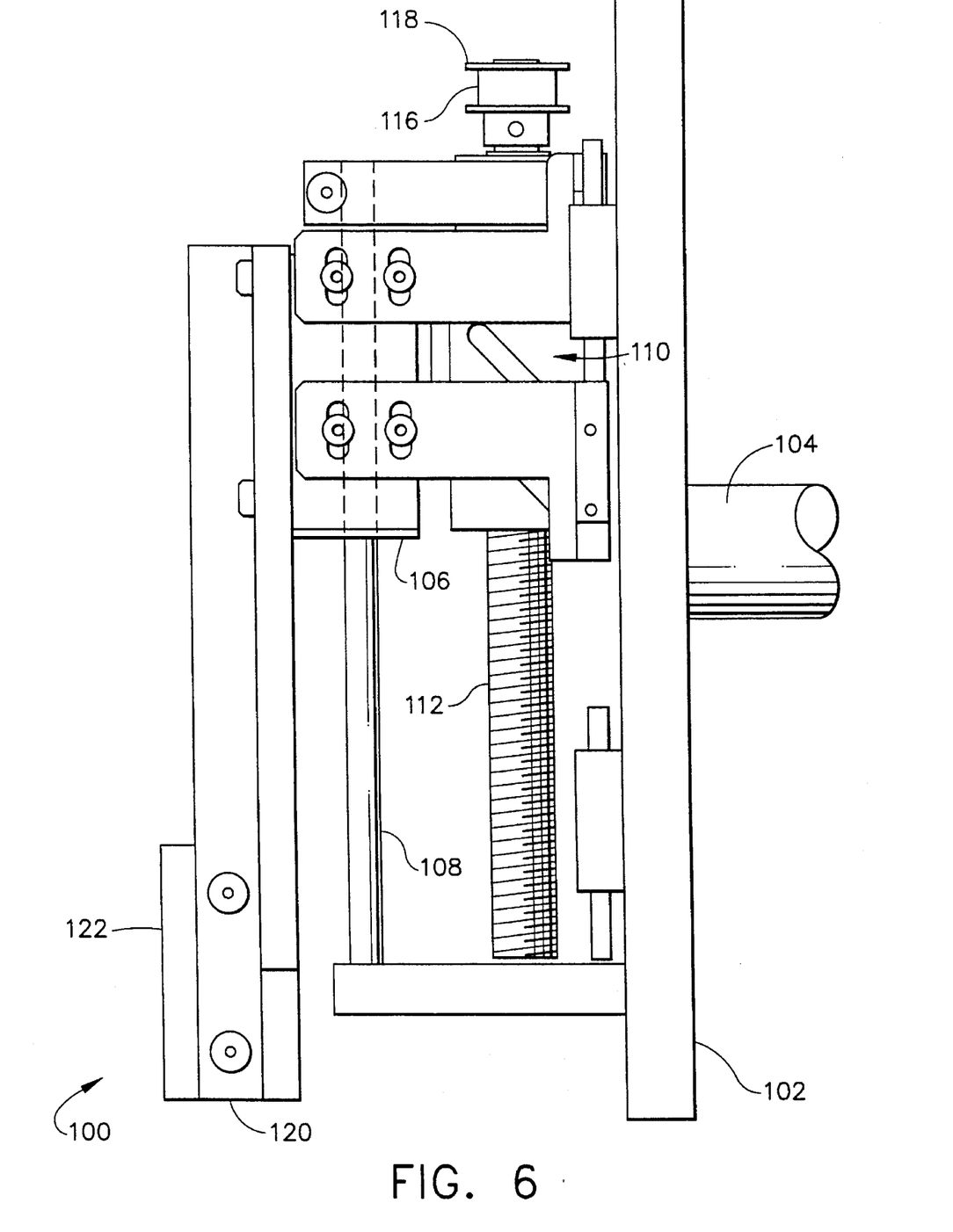
FIG. 6 is an elevation view of the side slide stage incorporated in the inspection tool shown in FIG. 4.

Referring to FIG. 6, the radial face stage 100 comprises a circular face stage plate 102 mounted on a rotation shaft 104. Rotation shaft 104, as previously mentioned, is seated inside and secured to the center spacer 80 (see FIG. 5). In response to rotation of center spacer 80, face stage plate 102 is rotated. Face stage plate 102 has a linear slide assembly mounted thereon. The linear slide assembly comprises a face stage slider 106 which slides along a pair of parallel linear shafts 108 (only one of which is visible in FIG. 7). The linear shafts 108 are connected to and supported by the face stage plate 102. The slider 106 is rigidly linked to a threaded coupling 110 which engages the threads of a lead screw 112. In response to rotation of lead screw 112, slider 106 slides along linear shafts 108. Conventional bearing means are provided.

The lead screw 112 is driven to rotate by a drive motor 114 (depicted in FIG. 8) which is mounted on the face stage plate 102 and coupled to the lead screw by way of timing pulleys and a timing belt 116. One of the timing pulleys designated 118 is visible in FIG. 6.

An angle bracket 120 is attached at one end to the slider 106. The other end of bracket 120 has a transducer mount 122 attached thereto. The transducer mount 122 carries a transducer pack 124 (shown in FIG. 8). These transducers are used to interrogate the core spray T-box to cover plate attachment weld 36 (see FIG. 3). The transducer mount 122 travels along a diameter of the face stage plate 102 when the lead screw 112 is rotated. Thus, the transducers can be moved both circumferentially (in response to rotation of the face stage plate 102) and radially (in response to rotation of lead screw 112). This allows the transducers in pack 124 to be optimally position to interrogate crevice weld 36 (see ultrasound beam path D in FIG. 3).

In accordance with a further aspect of the preferred embodiment, a pair of diametrally opposed air-actuated cylinders 126 are mounted on the face stage plate 102. Cylinders 126, when actuated by a solenoid valve 127, will drive respective pistons into abutment with the opposing face of the front cover plate 30b (see FIG. 2). Since the pistons exert equal and opposite forces, they can be used to align the radial face stage 100 relative to the front cover plate 30b prior to clamping the inspection tool onto the T-box arms.

Figure 7:
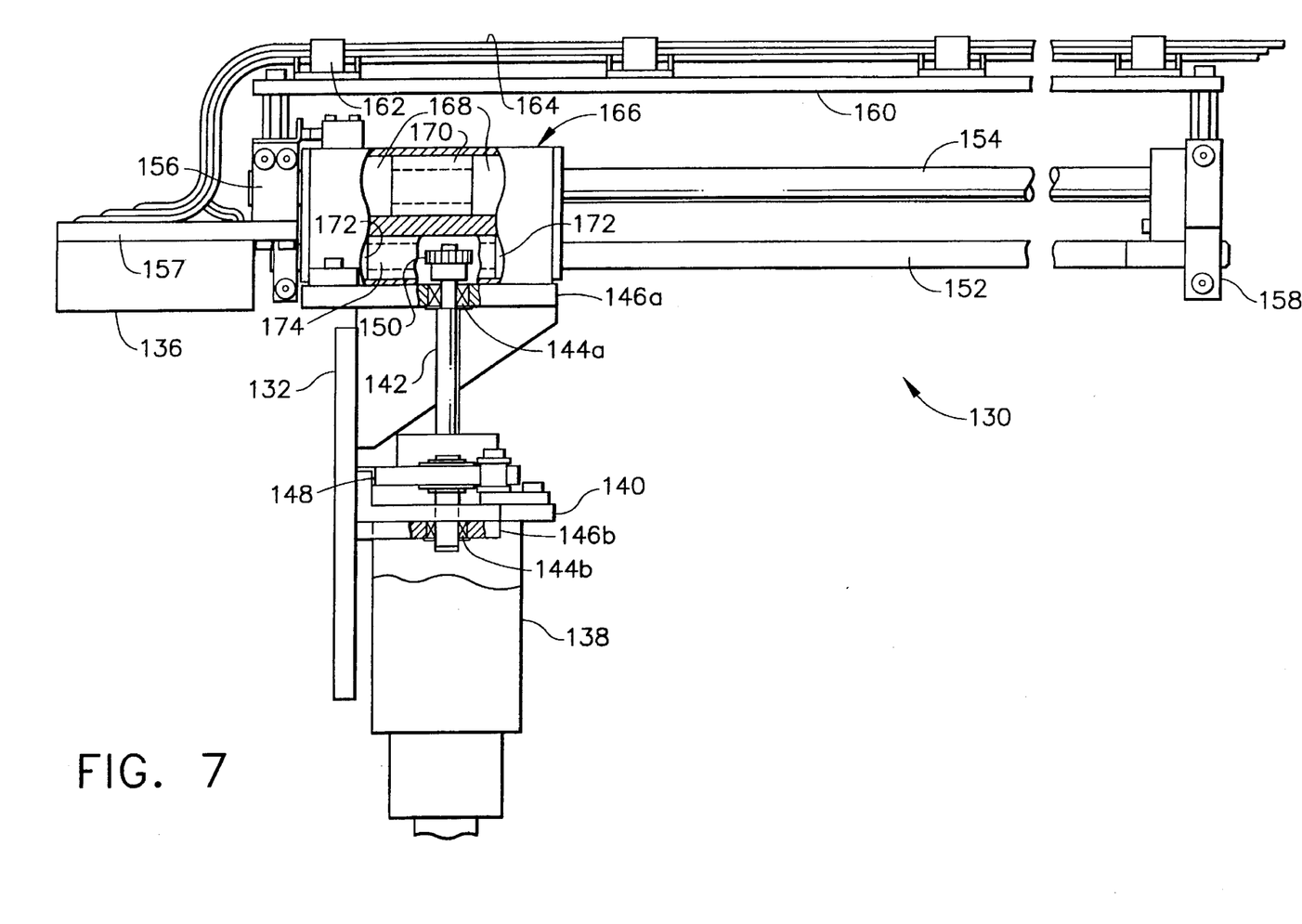
FIG. 7 is a plan view of the radial face stage incorporated in the inspection tool shown in FIG. 4.

Referring to FIG. 7, the side slide stage 130 comprises a slide support plate 132 which is attached to the side slide mounting plate 92 (see FIG. 5). By this attachment, the side slide stage 130 is rotatable about the axis of center spacer 80, which will be coaxial with the centerline axis of the thermal sleeve 32 (see FIG. 2) when the tool is properly installed. The side slide stage 130 further comprises a transducer pack 134 (depicted in FIG. 8) which is mounted on a side slide transducer mount 136. The transducer mount 136 is slidable in parallel with the axis of the thermal sleeve in response to activation of a drive motor 138, as explained in detail below.

The drive motor 138 is mounted on slide support plate 132 by way of a motor support bracket 140. Drive motor 138 drives rotation of a drive shaft 142 which is supported at two points along its length by ball bearings 144a and 144b, which are mounted in respective support plates 146a and 146b rigidly connected to slide support plate 132. The drive motor 138 is coupled to the drive shaft 142 via a timing belt mounted on a pair of timing pulleys. One of the timing pulleys 148, visible in FIG. 7, is mounted on the drive shaft 142.

The distal end of drive shaft 142 has a spur gear 150 mounted thereon. Spur gear 150 has teeth which engage the teeth of a gear rack 152 which forms part of an assembly. The slidable assembly further comprises a pair of linear shafts 154, only one of which is visible in FIG. 7. The linear shafts 154 and the gear rack 152 are supported at opposite ends by a shaft retainer block 156 and a rack support bar 158. Shaft retainer bar 156 is connected to an inspection slide plate 157, on which the transducer mount 136 is attached. Bars 156 and 158 also support a cable strap plate 160, which is provided with straps 162 for holding a plurality of coaxial cables 164. The coaxial cables 164 are connected to the transducers carried on transducer mount 136.

The entire assembly comprising rack 152, linear shafts 154, bars 156 and 158, cable strap plate 160, inspection slide plate 157 and transducer mount 136 is slidable in a slide support block 166. The slide support block 156 houses four ball bushing bearings 168 separated by a spacer 170. Each pair of ball bushing bearings 168 slidably supports a respective one of the linear shafts 154. Slide support block 166 further houses a pair of ball bushing bearings 172 separated by a spacer 174, which facilitate sliding of rack 152 relative to slide support block 166.

In response to actuation of drive motor 138, the spur gear 150, which engages the teeth of rack 152, is rotated, causing the rack to translate relative to slide support block 166. As a result of displacement of the rack 152, the entire slidable assembly can be translated relative to the T-box. In particular, the transducer mount 136 can be translated between a position whereat its transducers interrogate crevice weld 36 (see ultrasound beam paths A and B in FIG. 3) to a position whereat its transducers interrogate crevice weld 34 (see ultrasound beam path C in FIG. 3).

Figure 8:
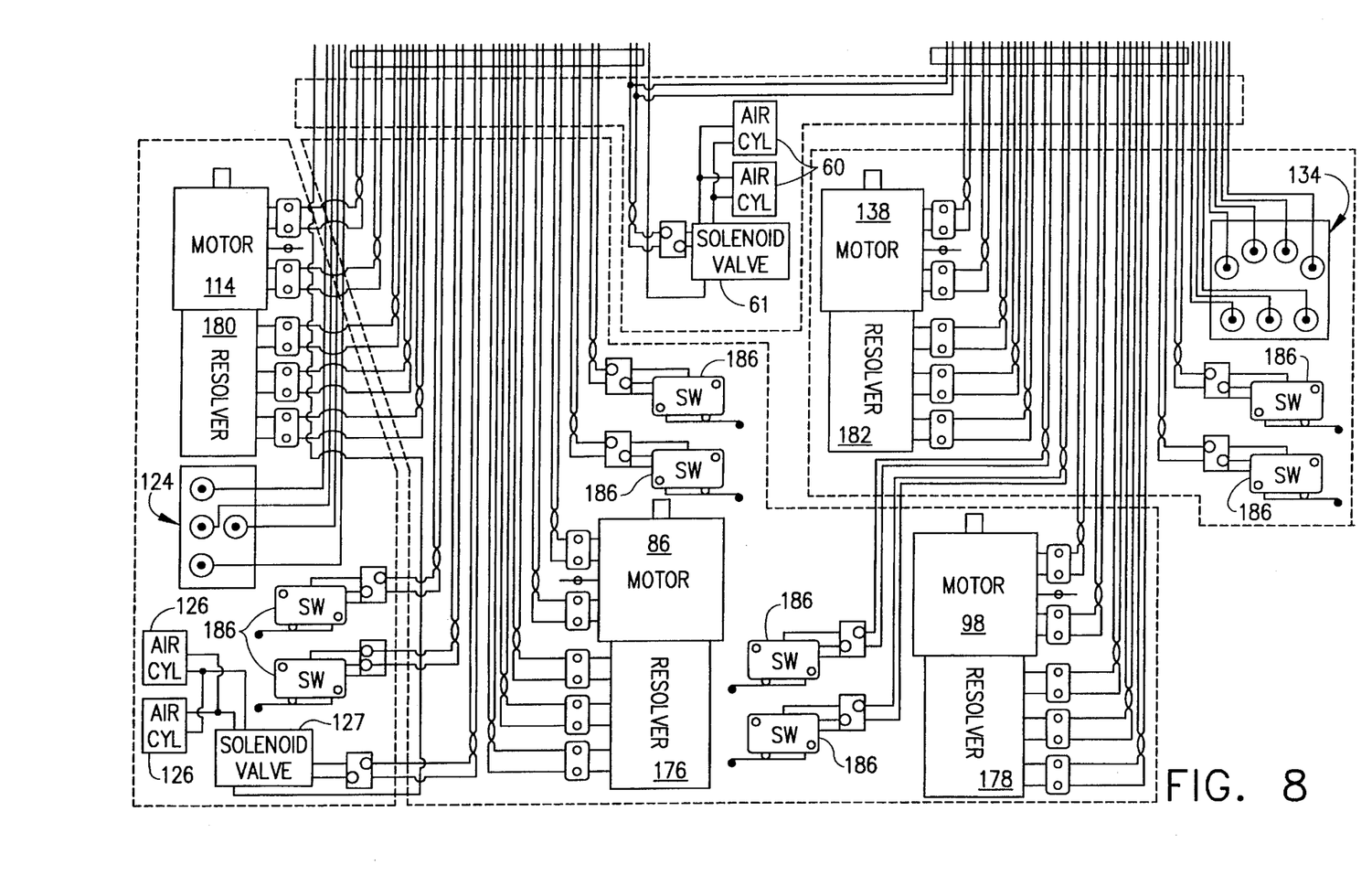
FIG. 8 is a schematic showing electrical and pneumatic connections in the tool shown in FIG. 4.

The electrical and pneumatic connections for the T-box inspection tool in accordance with the preferred embodiment are schematically depicted in FIG. 8. Each drive motor (86, 98, 114, 138) has a resolver (176, 178, 180, 182) coupled thereto. Each resolver encodes the position of the respective motor drive shaft and sends coded position signals back to the central computer system 184 (see FIG. 1). The motors and encoders are connected to the central computer via twisted pairs of 24-gauge wire. The ultrasonic transducers are connected to the central computer via individual coaxial cables. The air-actuated cylinders are connectable to an air compressor via ⅛-inch ID air hoses. For each degree of freedom, a pair of limit switches 186 are provided. These limit switches are preferably microswitches having a contact arm which is rotated to a closed position when the respective transducer reaches its limit of allowable rotation or translation. The corresponding motor is deactivated in response to closure of each limit switch. Limit switches 186 and solenoid valves 61 and 127 are connected to the central computer via 24-gauge wire.

Ultrasound is a common means of nondestructively inspecting materials for flaws and structural integrity. For steels, the preferred frequency used for inspection and sizing of flaws is in the range of 1 to 10 MHz with 2.25 to 5 MHz preferred. Ultrasonic transducers and associated electronics are conventional in the art of nondestructive examination. In accordance with conventional practice, pulsed ultrasound generated by a transducer propagates into the metal to be inspected via a coupling fluid, such as water, in contact with the surface of the metal. Discontinuities in the metal (e.g., cracks) produce ultrasonic pulse reflections, due to sudden changes in acoustic impedance, that are dependent on factors such as flaw size and shape, angle of incidence, and metal path length. These reflections are detected by ultrasonic transducers operating in a reception mode. All transducers incorporated in the inspection tool of the present invention are of the immersion type with frequency in the range of 2.25–10 MHz and have active diameters in the range of 0.25–1.0 inch.

The above-described inspection tool performs ultrasonic scanning in three modes depicted in FIG. 3. In the first mode, transducer pack 124 scans crevice weld 34 and the heat-affected zone thereof. In the second mode, transducer pack 134 scans crevice weld 34 and the heat-affected zone thereof. In the third mode, transducer pack 134 scans crevice weld 36 and the heat-affected zone thereof.

For inspection of the thermal sleeve attachment weld, the transducers are designed to produce angled beam refracted longitudinal and/or shear waves of 35° to 70° resulting in the ultrasonic beam being perpendicular to the thermal sleeve attachment weld, with allowable skew up to and including angles of plus or minus 20°. When performing immersion tests the water gap distance should not be less than 0.25 inch. For inspection of the front cover plate attachment weld, the angle beam transducers include longitudinal wave transducers to detect indications lying perpendicular to the beam.

The examinations may be conducted using multiple transducers, frequencies and angles in sequence or in parallel. These examinations are performed with single or multiple transducers which have a minimum of 50% beam overlap of the complete area to be examined, skew angles and multiple examinations considered. Examination coverage for the thermal sleeve attachment weld is limited to the maximum scanning radius area allowed by the restriction between the T-box piping arms, both top and bottom. The examination coverage for the T-box end plate is 360° both from the top surface and the horizontal face. Less than 360° scanning is allowed if mechanical restrictions are encountered by the piping attachments.

All scanning equipment is remotely motor driven with appropriate encoders and motor controls to assure that the proper scanning motion will be achieved. In cases where raster scans are used, the motor controller has the capability of providing a rotational index which results in a minimum of a 50% scan overlap. The resolvers provide position information to the data acquisition system with regard to transducer position. The scanners have variable speed control so as to limit scanning speed to less than 6 inches/sec.

The foregoing preferred embodiment has been disclosed for the purpose of illustration. Variations and modifications which do not depart from the broad concept of the invention will be readily apparent to those skilled in the design of ultrasonic inspection equipment. All such variations and modifications are intended to be encompassed by the claims set forth hereinafter.

We claim:

1. An apparatus for remotely inspecting a crevice weld in a T-box assembly which connects an inlet pipe to two outlet pipes, the two outlet pipes extending from opposite sides of the T-box, the inlet pipe extending perpendicular to the two outlet pipes, and the crevice weld lying along a circle which is concentric with and perpendicular to a centerline axis of the inlet pipe, comprising:

a stationary support frame;

first and second pairs of clamping jaws attached to said stationary support frame, each of said first and second pairs of clamping jaws having jaws which can be moved toward each other to clamp onto a respective outlet pipe;

remotely controlled drive means for moving said respective jaws of said first and second pairs of clamping jaws toward each other;

a first rotating frame rotatably mounted on said stationary support frame, said first rotating frame being rotatable about an axis of rotation; and first transducer means supported by said first rotating frame, whereby said stationary support frame can be clamped onto the outlet pipes such that said axis of rotation is coaxial with said centerline axis.

2. The apparatus as defined in claim 1, wherein said remotely controlled drive means comprise a respective pair of pneumatic cylinders.

3. The apparatus as defined in claim 1, wherein said stationary support frame has a first drive motor and a first drive train mounted thereon, said first rotating frame being rotatable about said axis of rotation in response to activation of said first drive motor.

4. The apparatus as defined in claim 3, wherein said first drive train comprises a worm gear driven by said first drive motor.

5. The apparatus as defined in claim 3, wherein said first rotating frame comprises a side slide stage having a second drive motor, a second drive train and a transducer carriage mounted thereon, said transducer carriage carrying said first transducer means and being slidable in parallel with said axis of rotation in response to activation of said second drive motor.

6. The apparatus as defined in claim 3, wherein said first rotating frame comprises a radial face stage having a second drive motor, a second drive train and a transducer carriage mounted thereon, said transducer carriage carrying said first transducer means and being slidable in a direction perpendicular to said axis of rotation in response to activation of said second drive motor.

7. The apparatus as defined in claim 1, further comprising:

a second rotating frame rotatably mounted on said stationary support frame, said second rotating frame being rotatable about said axis of rotation; and second transducer means supported by said second rotating frame, wherein said first and second rotating frames are independently rotatable about said axis of rotation.

8. The apparatus as defined in claim 7, wherein said stationary support frame has first and second drive motors and first and second drive trains mounted thereon, said first and second drive trains being respectively coupled to said first and second drive motors, said first and second rotating frames being rotatable about said axis of rotation in response to activation of said first and second drive motors respectively.

9. The apparatus as defined in claim 8, wherein said first rotating frame comprises a side slide stage having a third drive motor, a third drive train and a first transducer carriage mounted thereon, said first transducer carriage carrying said first transducer means and being slidable in parallel with said axis of rotation in response to activation of said third drive motor, and said second rotating frame comprises a radial face stage having a fourth drive motor, a fourth drive train and a second transducer carriage mounted thereon, said second transducer carriage carrying said second transducer means and being slidable in a direction perpendicular to said axis of rotation in response to activation of said fourth drive motor.

10. The apparatus as defined in claim 9, wherein said first and second drive trains each comprise a respective worm gear driven by said first and second drive motors respectively, said third drive train comprises a spur gear driven by said third drive motor, and said fourth drive train comprises a lead screw driven by said fourth drive motor.

11. An apparatus for remotely inspecting an arc-shaped portion of a welded joint having a centerline axis and joining two components of a welded piping system, comprising:

a stationary support frame;

means for clamping said stationary support frame onto said welded piping system;

a first rotating frame rotatably mounted on said stationary support frame, said first rotating frame being rotatable about an axis of rotation;

first transducer means supported by said first rotating frame;

a second rotating frame rotatably mounted on said stationary support frame, said second rotating frame being rotatable about said axis of rotation; and second transducer means supported by said second rotating frame, wherein said first and second rotating frames are independently rotatable about said axis of rotation, and said clamping means are attachable to said welded piping system such that said axis of rotation is coaxial with said centerline axis.

12. The apparatus as defined in claim 11, wherein said clamping means comprise a pair of clamping jaws for clamping onto pipes of said welded piping system in response to activation of a respective pair of pneumatic cylinders.

13. The apparatus as defined in claim 11, wherein said stationary support frame has first and second drive motors and first and second drive trains mounted thereon, said first and second drive trains being respectively coupled to said first and second drive motors, said first and second rotating frames being rotatable about said axis of rotation in response to activation of said first and second drive motors respectively.

14. The apparatus as defined in claim 13, wherein said first rotating frame comprises a side slide stage having a third drive motor, a third drive train and a first transducer carriage mounted thereon, said first transducer carriage carrying said first transducer means and being slidable in parallel with said centerline axis in response to activation of said third drive motor, and said second rotating frame comprises a radial face stage having a fourth drive motor, a fourth drive train and a second transducer carriage mounted thereon, said second transducer carriage carrying said second transducer means and being slidable in a direction perpendicular to said centerline axis in response to activation of said fourth drive motor.

15. The apparatus as defined in claim 14, wherein said first and second drive trains each comprise a respective worm gear driven by said first and second drive motors respectively, said third drive train comprises a spur gear driven by said third drive motor, and said fourth drive train comprises a lead screw driven by said fourth drive motor.

16. The inspection apparatus as defined in claim 11, further comprising first and second bearing means each having first and second relatively rotatable parts, wherein said stationary support frame comprises a fixed plate connected to said first relatively rotatable part of said first bearing means, said first rotating frame comprising a center spacer connected at one end to said second relatively rotatable part of said first bearing means and connected at the other end to said first relatively rotatable part of said second bearing means, and second rotating frame comprising a side slide plate connected to said second relatively rotatable part of said second bearing means.

* * * * *